United States Patent [19]

Hennick

[11] 4,341,995
[45] Jul. 27, 1982

[54] VELOCITY PROFILE ANALYZER

[75] Inventor: Robert P. Hennick, Dudley, Mass.

[73] Assignee: American Optical Corporation, Southbridge, Mass.

[21] Appl. No.: 268,637

[22] Filed: May 29, 1981

[51] Int. Cl.³ .............................................. G01P 3/56
[52] U.S. Cl. .................................... 324/161; 328/134
[58] Field of Search ................ 324/161; 328/134, 142; 364/565

[56] References Cited

U.S. PATENT DOCUMENTS

| | | |
|---|---|---|
| 2,766,940 | 10/1956 | Weston ........................... 328/134 X |
| 3,585,508 | 6/1971 | Crowther ............................ 328/134 |
| 3,681,523 | 8/1972 | Sidline . |
| 3,731,301 | 5/1973 | Davis . |
| 3,733,472 | 5/1973 | Taisne . |
| 3,885,420 | 5/1975 | Wolfinger . |
| 3,895,293 | 7/1975 | Munz . |
| 4,122,332 | 10/1978 | Wilkinson . |
| 4,122,391 | 10/1978 | Harp et al. . |
| 4,123,704 | 10/1978 | Johnson . |
| 4,137,496 | 1/1979 | Lind . |
| 4,150,432 | 4/1979 | Sorden . |

FOREIGN PATENT DOCUMENTS 2345549  4/1975  Fed. Rep. of Germany ...... 324/161
1362740  8/1974  United Kingdom ................ 324/161

Primary Examiner—Stanley T. Krawczewicz
Attorney, Agent, or Firm—Dennison, Meserole, Pollack & Scheiner

[57] ABSTRACT

A velocity profile analyzing device measures the change or non-linearity in the velocity of a system under test, and digitally displays the measured variation. The principle of operation is to determine any velocity differences that occur in relation to an ideal state, and to present via a digital display the difference value. The system derives from a linear encoder a velocity representative signal, which includes a grating output coupled to a first counter, and an index output for simultaneously starting the first counter and a second counter coupled to receive a reference frequency signal. The counter outputs are fed to a digital subtractor which provides a digital difference frequency signal for digital display and recording. The digital display may be scaled to directly indicate velocity difference, which can be analyzed for various cyclic or other perturbations without accommodating the whole range of deviation. This provides simple instrumentation, and both instantaneous and permanent displays of the velocity variations.

9 Claims, 1 Drawing Figure

VELOCITY PROFILE ANALYZER

BACKGROUND OF THE INVENTION

1. Field of the Invention.

This invention relates to apparatus for measuring the variation or non-linearity in the velocity profile of a system under test.

2. Description of the Prior Art.

Various prior art systems are known which provide an encoded electrical signal in response to mechanical motion. These systems, of which U.S. Pat. Nos. 4,122,332, 3,731,301, 3,733,472, and 3,885,420 are representative, are generally complex systems requiring many electronic components. Wilkenson, in U.S. Pat. No. 4,122,332, provides a shaft encoder which produces an encoded electrical signal in accordance with rotation of a shaft. The electrical signal is further processed through a plurality of code converters, before being coupled to a comparator which receives a converted reference signal at its other input. The two inputs of the comparator are thereby analog signals, and the output is simply indicative of the condition wherein one signal is greater than or equal to the other signal. The comparator output is further processed and utilized to activate a warning unit.

The Davis patent, U.S. Pat. No. 3,731,301, shows a system for providing a control signal indicative of the deviation of the state of movement of a jet engine shaft. This system stores and subsequently provides the difference between two successive samples, if the difference between two successive samples is more than a predetermined amount. Thus, this system requires a plurality of memory devices to cyclically sample and store successive encoded signals. Therefore, this system simply achieves a continuous comparison between encoded signals, to provide a control signal, but does not contemplate either comparison with a predetermined reference signal or the precise display of the exact difference.

A similar system which requires a plurality of memory circuits, and extensive digital circuitry, is shown by U.S. Pat. No. 3,733,472 to Taisne. This system detects counting errors in an encoded output signal, by performing a plurality of discrimination and differencing operations. The difference between a sensed value and a registered value is memorized at the beginning of measurement, and subsequent sensed values are continuously compared with the memorized difference. The system detects noncoincidence between the instantaneous difference and the memorized difference for the purpose of actuating an alarm.

The Wolfinger patent, U.S. Pat. No. 3,885,420 shows a system for measuring small variations in the speed of rotating shafts. This system compares a zero-crossing detected shaft signal with an oscillator reference signal via a phase detector. The phase detected output signal is further subjected to low-pass filtering and notch filtering to produce a signal having an amplitude and frequency corresponding to torsional vibration of the shaft.

It can be seen that the prior art systems are relatively complex, and yet do not provide a specific digital output signal representative of speed variation, or non-linearity of velocity. Further, no prior art system has accomplished the measurement of velocity differences in as simple and direct a manner as is achieved by the present invention.

Accordingly, it is the main object of the present invention to provide a digital electronic circuit of simple construction for measuring the exact deviation of a detected velocity from a reference velocity.

Another object of the invention is to provide an electronic frequency deviation monitor which gives an instantaneous visual indication of the exact deviation from a nominal frequency.

Other objects and advantages of the invention will be apparent from the following description and appended claims.

SUMMARY OF THE INVENTION

The velocity profile analyzing apparatus compares the output from a linear encoder to a reference signal. The linear encoder output signal includes an index output and a grating output. A signal processor couples the grating output, representative of frequency, to a first counter, while a reference oscillator supplies a reference frequency signal to a second counter. Both counters are simultaneously started by the index output from the signal processor. The outputs of the two counters are coupled to a digital subtractor which produces a digital output equal to the difference in frequency between the grating output signal and the reference oscillator signal. This difference is digitally displayed, and permanently recorded, to provide an instantaneous display and recorded measurement of the variation or non-linearity in the velocity profile.

The system of the present invention, including the construction and operation thereof, may best be understood by reference to the accompanying description taken in connection with the accompanying drawing.

DESCRIPTION OF THE PREFERRED EMBODIMENT

Figure 1:
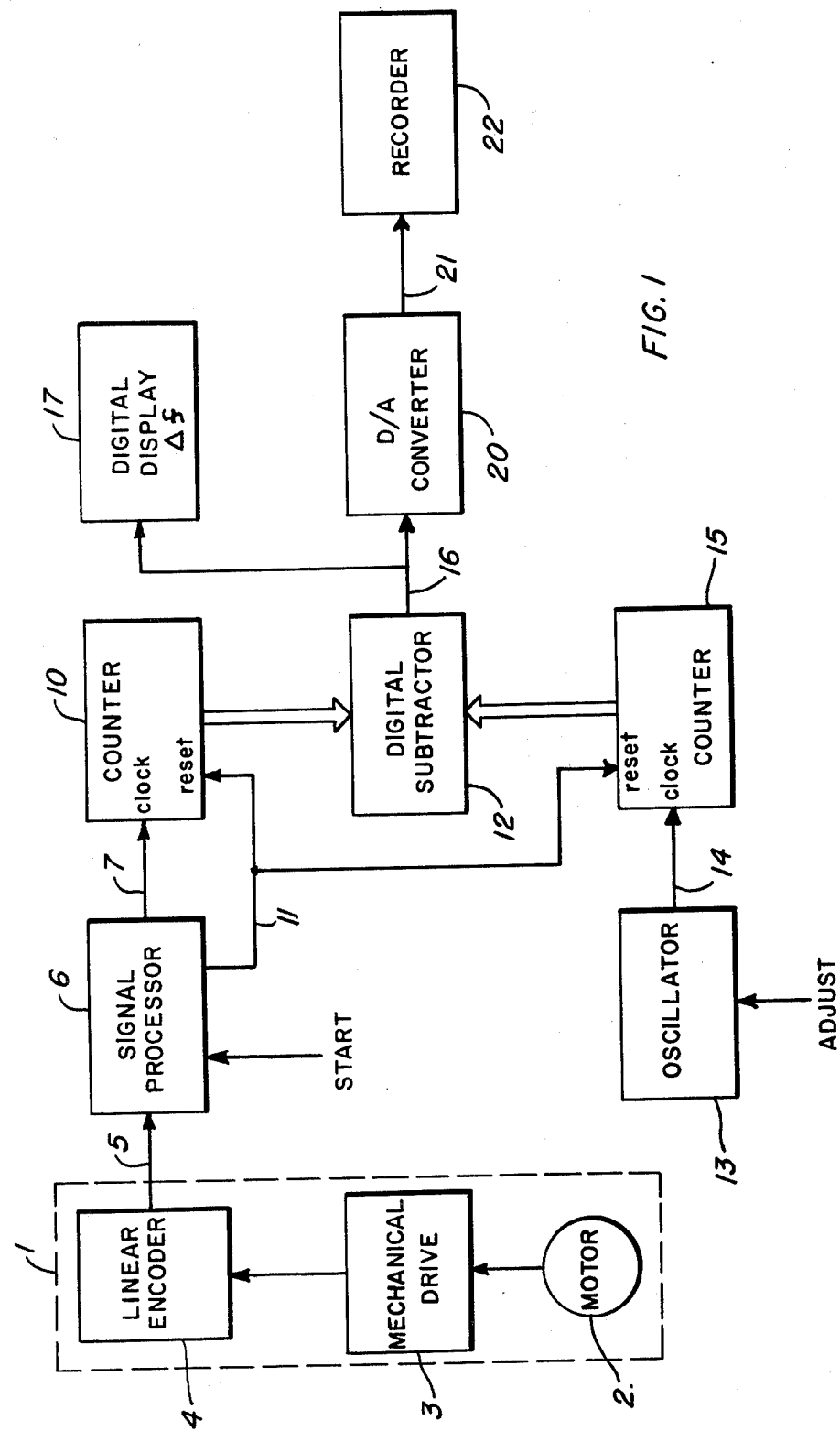
FIG. 1 is a block diagram of a velocity profile analyzer having both digital and analog indication of velocity change.

A block diagram of the preferred embodiment of the invention is illustrated in FIG. 1. A velocity profile analysis is performed on a frequency encoded signal derived from a linear encoder signal source 1. Linear encoder signal source 1 includes motor 2 coupled to mechanical drive 3, and a linear encoder 4 responsive to the speed of the mechanical drive to provide an encoded output signal on line 5. The linear encoder 4 includes an optical encoding grating, which operates in a conventional manner.

Signal processor 6 gates the linear-encoded output signal in response to a "start" signal. The start signal may simply be a remote manual start signal initiated by a person performing the analysis on the system under test. Alternatively, the start of the test operation may provide a start signal for the analysis in an automatic manner.

In either case, the encoded output signal is gated through to output line 7. The linear-encoded signal generated on output line 7 includes a velocity representative signal, which may be either an analog signal having a frequency proportional to the speed of the mechanical drive, or a digital signal (grating output) having a pulse repetition frequency proportional to the mechanical drive speed. Alternative forms of pulse encoding may be used, as desired. Either analog or digital components may be used in the linear encoder and signal processor circuits. The structure and operation of signal processor 6 correspond to a simple gating function, which will be more clearly understood as described below.

The velocity representative frequency encoded signal gated on output line 7 is coupled to the clock input of counter 10. Counting is initiated by an index output signal gated by signal processor 6, via line 11, to the reset input of counter 10. The index output signal may be the optical grating index line signal from the linear-encoded signal on line 5. In an alternative embodiment, the function of the index signal in initiating the start of a measuring cycle may be replaced by the use of a remote manual reset switch (not shown), actuated by a person conducting the analysis. In the alternative embodiment, the remote start switch will gate the frequency encoded signal to the clock input of counter 10. The start signal will also be coupled to the reset input of counter 10, to initiate counting. Thus, in its simplest form, signal processor 6 may simply gate the start signal and the velocity representative encoded signal to the reset and clock terminals respectively. In the first embodiment, the signal processor would comprise almost as simple circuit elements as in the alternative embodiment, and would merely have to selectively gate the two signal components of the frequency encoded signal to the respective clock and reset terminals. In either case, the output of counter 10 will be connected to one input of digital subtractor 12.

There is further provided a signal having a reference frequency, from oscillator 13, in order to measure the variation or non-linearity in the velocity profile of the system under test. Oscillator 13 has an adjustment means, for manual or automatic adjustment of the reference frequency, and for offsetting the reference frequency a predetermined amount. The oscillator output is coupled by line 14 to the clock input of the second counter 15. The reset inputs of counter 10 and counter 15 are coupled to receive the same index signal, or start signal, on line 11. This ensures that both counters start counting simultaneously. The output of counter 15 is connected to the second input of digital subtractor 12.

The frequency difference $\Delta f$ is directly calculated by digital subtractor 12 using equations one and two:

$$\Delta f = (f_t - f_o) \qquad [EQ. 1]$$

where
$\Delta f$ = velocity change in counts per second
$f_o$ = reference frequency; a function of velocity rate to be observed
$f_t$ = the measured frequency as a function of the unit under test, where $f_t$ is calculated using the following equation:

$$f_t = A \cdot B \qquad [EQ. 2]$$

where
A = linear optical encoder output in counts/distance and
B = velocity rate in distance/time.

The selection of the input reference frequency ($f_o$) can be determined in accordance with the following considerations: (a) the range of the A/D converter used, and the conversion time required; and (b) the stability value of the reference input.

The direct connection of the two frequency input signals to the two counters, 10 and 15, and the further direct connection of the counter outputs to the digital subtractor 12 enables an instantaneous update of the variation between $f_o$ and $f_t$. The direct connection and immediate update are features of the preferred embodiments which arise from the simple design, minimizing the number of component parts, and thereby achieving economical manufacture and reliable operation.

The output from digital subtractor 12 is coupled via line 16 to digital display 17, and to digital to analog converter 20. The update of the digital display of variation between $f_o$ and $f_t$ is limited only be the response of the human eye to the visual change occurring. To ensure a permanent record of the instantaneous update, the output of digital to analog converter 20 is coupled via line 21 to a recorder 22. The recorder is preferably a strip chart recorder, which will make variations (i.e., non-linearities) in velocity change immediately visable. Other forms of hard copy records may be obtained by establishing a computer data output link.

The overall scheme accuracy ($\Delta f$) is determined according to the equations which follow.

The percent variation is equal to $\Delta f$ times 100, calculated from equations three and four:

$$f_{error} = \sqrt{\Delta f_R^2 + 1^2 + 1} = \sqrt{\Delta f_R^2 + 2} \text{ (counts)} \qquad [EQ. 3]$$

where
$\Delta f_R$ = reference oscillator stability
and counter accuracy = 1 count
D/A converter accuracy = $\pm \frac{1}{2} LSB \simeq 1$ count.

Thus, the velocity change of the unit under test can be determined by considering:

$$\Delta f = f_t - (f_o \pm f_{error}) \qquad [EQ. 4]$$

This gives the overall scheme accuracy ($\Delta f$) which essentially depends upon the frequency difference, and not the range of measuring frequency. The percent deviation will be the error in velocity over the counter time interval for the digital output, or the error in velocity over the sum of the counter time and D/A conversion intervals for the analog output.

The counting capacity of the counters is equal to or exceeds the count per total interval value. The reference frequency can be determined by using the preceeding equations. As the reference frequency is a function of the velocity rate to be observed, reference oscillator 13 may be a variable frequency oscillator, whose frequency is manually or automatically adjusted in accordance with the velocity of the moving mechanical component.

During operation, the system derives a cycle to cycle (essentially instantaneous) subtraction of the two counts from counters 10 and 15. The difference signal is immediately displayed in numerical form on digital display 17. The digital display may further include a scale conversion feature, to directly indicate velocity change in numerical form, in the appropriate units of measurement.

The output of digital subtractor 16 is further utilized to provide an analog output, which is derived from digital to analog converter 20, programmed for an automatic conversion cycle. Thus, the analog output is updated at the conversion rate of the unit. In selecting the appropriate digital to analog converter, the following must be considered: (a) the conversion rate time in relation to anticipated velocity change; and (b) the amount of offset frequency, or maximum input (digital) count. The analog output can be a D.C. voltage, and can be scaled to suit the recording instrumentation range.

Having thus described the invention, what is claimed is:

1. An apparatus for measuring the velocity change of a moving mechanical component, including means for generating an encoded electrical signal in accordance with movement of said mechanical component, said encoded electrical signal including an index signal and a velocity representative signal, comprising:

signal processing means coupled to receive said encoded electrical signal, for providing said velocity representative signal at a first output and said index signal at a second output;

first counter means coupled to said signal processing means, said first counter means having a clock input connected to said first output for receiving said velocity representative signal, and a reset input connected to said second output for receiving said index signal, said first counter means having an output;

oscillator means for generating a signal having a predetermined frequency;

second counter means having a clock input coupled to receive said oscillator signal, and a reset input connected to said second output for receiving said index signal, said second counter means having an output;

digital subtractor means having a first input connected to the output of said first counter means, and a second input connected to the output of said second counter means, said digital subtractor means having an output; and, digital display means connected to the output of said digital subtractor means for providing a numerical display of the velocity change of the moving mechanical component.

2. An apparatus for measuring the velocity change of a moving mechanical component, comprising:

means for providing an encoded electrical signal representative of the velocity of said moving mechanical component;

remote start means for producing a start signal at the start of a measurement of velocity change;

signal processing means having first and second inputs coupled to receive said encoded electrical signal and said start signal, respectively, and having first and second outputs, said signal processing means providing said encoded electrical signal at said first output and said start signal at said second output in response to receiving said start signal at said second input;

first counter means coupled to said signal processing means, said first counter means having a clock input connected to said first output for receiving said encoded electrical signal, and a reset input connected to said second output for receiving said start signal, said first counter means having an output;

oscillator means for generating a signal having a predetermined frequency;

second counter means having a clock input coupled to receive said oscillator signal, and a reset input connected to said second output for receiving said start signal, said second counter means having an output;

digital subtractor means having a first input connected to the output of said first counter means, and a second input connected to the output of said second counter means, said digital subtractor means having an output; and, digital display means connected to the output of said digital subtractor means for providing a numerical display of the velocity change of the moving mechanical component.

3. An apparatus for measuring velocity change according to either claim 1 or claim 2, further comprising:

adjustment means for setting said oscillator means at said predetermined frequency, said predetermined frequency being set as a function of the velocity of said moving mechanical component.

4. An apparatus for measuring velocity change according to claim 3, wherein said digital display means has a range in accordance with the range of output signals from said digital subtractor means, whereby said digital display is only responsive to change in velocity to numerically display incremental velocity change.

5. An apparatus for measuring velocity change according to claim 4, further comprising:

digital to analog converter means coupled to the output of said digital subtractor, said digital to analog converter means for producing a D.C. signal at an output; and, recorder means coupled to the output of said digital to analog converter means for making a record of said D.C. signal.

6. An apparatus for measuring velocity change according to claim 1, further comprising:

remote start means coupled to said signal processing means for gating said encoded electrical signal at the start of a measurement of velocity change.

7. An apparatus for measuring the velocity change of a moving object, comprising:

means for generating an encoded electrical signal representative of the velocity of said moving object;

first counter means coupled to receive said encoded electrical signal, and having a digital output representative of said velocity of said moving object;

oscillator means for generating a reference signal representative of a predetermined reference velocity;

second counter means coupled to receive said reference signal, and having a digital output representative of said predetermined reference velocity;

means for starting said first and second counter means simultaneously;

digital subtractor means having first and second inputs coupled to receive the digital outputs of said first and second counter means, respectively; and, digital display means for providing a numerical display in accordance wih the digital subtractor means output, whereby there is displayed a measurement of the velocity change of said moving object, from said predetermined reference velocity.

8. An apparatus for measuring velocity change according to claim 7, wherein said means for starting said first and second counter means further comprises means for repeatedly resetting said first and second counter means at the same time, whereby there is sequentially displayed a plurality of measurements of incremental velocity change.

9. An apparatus for measuring velocity change according to claim 8, further comprising:

digital to analog converter means coupled to receive the digital subtractor means output, said digital to analog converter means producing a D.C. output signal; and, recorder means for making a record of said D.C. output signal, whereby said recorder means sequentially records a plurality of measurements of incremental velocity change.

* * * * *